June 30, 1959 K. STOLL 2,892,623
TORSION BAR SUSPENSION SYSTEMS
Filed Nov. 13, 1956
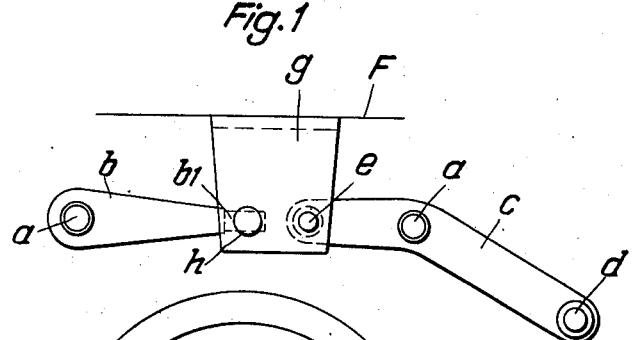
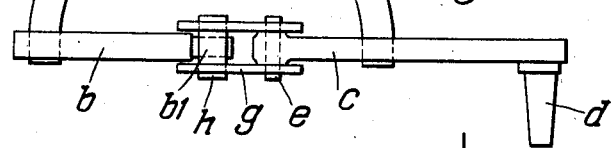
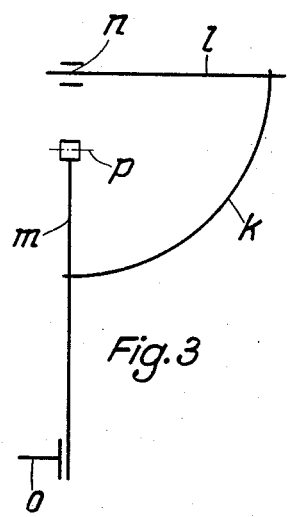
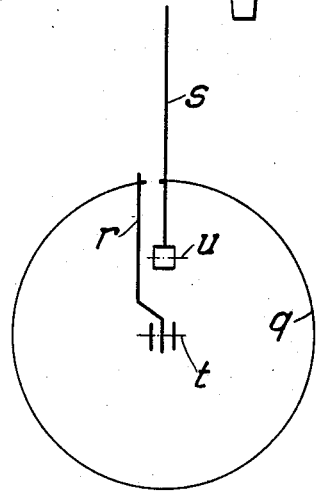
Inventor:
KARL STOLL
by his Attorneys
Howson and Howson

United States Patent Office 2,892,623
Patented June 30, 1959

2,892,623
TORSION BAR SUSPENSION SYSTEMS

Karl Stoll, Dusseldorf, Germany, assignor to Mannesmann Aktiengesellschaft, Dusseldorf, Germany, a German company Application November 13, 1956, Serial No. 621,868

Claims priority, application Germany November 14, 1955

3 Claims. (Cl. 267—57)

The invention relates to a torsion bar suspension system in which the torsion bar is arranged as part of a crank and provided with at least two supporting levers of different lengths which, in cooperation with rigid thrust blocks and upon tilting of the crank, turn the torsion bar through an angle which depends on the length ratio of the levers and which can be smaller than the angular deflection of the crank if the length ratio of the levers is chosen accordingly.

In a known system of this type a straight torsion bar is used. The supporting levers rigidly attached thereto extend substantially towards the pivotal axis of the crank.

The system according to the invention differs from this known one in that the torsion bar is arcuate in shape and the unequal supporting levers extend radially therefrom towards its centre of curvature.

The arc can be of any desired length, such as a quadrant or semicircle or complete circle. The strain in the torsion bar is as that in a helical spring. The thrust blocks for the supporting levers may be arranged close to each other and form a unitary suspension mechanism.

In general, two supporting levers at the ends of the arcuate torsion bar are sufficient. In order to avoid bending stresses in the bar as far as is possible, the thrust block for one lever is at the centre of curvature of the bar. The second lever, which is not mounted at the centre of curvature, may be shorter or longer than the centrally mounted lever. With a view to avoiding bending stresses in the bar it is preferred to let the load which is to be absorbed resiliently—for example the axle bearing pressure of an automobile suspension—to be received by the non-centrally mounted lever.

Examples of the invention will now be more clearly described with reference to the accompanying drawing, in which:

Figures 1 and 2 are a side and plan view, respectively, of a semicircular torsion bar suspension system according to my invention, Figures 3 and 4 are schematic plan views of a quadrant and circular torsion bar suspension system, respectively.

In the example illustrated in Figures 1 and 2, the torsion bar consists of a semi-circular steel tube $a$, the ends of which are rigidly connected to radially extending levers $b$ and $c$. The lever $c$ extends outwardly beyond the bar $a$ and carries the axle stump $d$ of a vehicle. The lever $c$ can tilt about a pin $e$ which is located beyond the centre of curvature of the bar $a$ and which is held in a mounting $g$ carried by the frame $f$ of a vehicle to be sprung. Within the mounting $g$ a rotatable and axially movable pin $h$ extends through the centre of curvature of the bar $a$.

The pin $h$ is provided with a bore which passes through the centre of curvature of the bar $a$ and through which there extends a cylindrical extension of $b1$ of the lever $b$. The lever $b$ can thus tilt about the axis of the bolt $h$, turn about its own axis and move axially.

When the lever $c$ is deflected by a jolt on the axle stump $d$, the arcuate torsion bar $a$ is twisted like a helical spring. The angle of twist, with a supporting lever length ratio such as that shown, is considerably smaller than the angular deflection of the lever $c$.

In the example shown in Figure 3, a torsion bar $k$ is bent into quadrant shape. Supporting levers $l$ and $m$ are connected to its ends. A thrust block $n$ for the lever $l$ is at the centre of curvature of the bar $k$. The lever $m$ which carries an axle stump $o$ can tilt about a non-central axis $p$.

In Figure 4, the torsion bar $q$ is bent to form a substantially full circle. Two levers $r$ and $s$ are connected to its ends. The lever $r$ is supported at $t$ at the centre of the circle whilst the lever $s$, which could form or carry the wheel axle, is tiltable about a non-central axis $u$.

The torsion bar may, of course, be bent to form several circular turns.

To avoid tipping moments in the rigid thrust blocks for the supporting levers it is preferred to arrange the thrust blocks so that the supporting forces and the external force which is to be resiliently absorbed act in the same plane (see Figure 3).

It is very advantageous to use a steel tube for the torsion bar, in which case an oval section can be chosen which is particularly effective for transmitting torque from the supporting levers to the tube and vice versa.

I claim:

1. A torsion bar suspension system comprising, an arcuately-shaped torsion bar, two levers of different lengths, each of said levers being connected to said torsion bar at the ends thereof and extending from said connection toward the center of curvature of the torsion bar, a pair of thrust blocks in which the thrust block for one lever is located at the center of curvature of the torsion bar and the thrust block for the other lever is located at a point between the torsion bar and the center of curvature of the torsion bar and which lever is adapted to receive the external force, and means for pivotally connecting the inner ends of each of said levers with said thrust blocks, said means having pivotal axes which lie in the same plane as the torsion bar and extend at right angles to the pivotally-attached levers.

2. The torsion bar suspension system defined in claim 1, in which the torsion bar is a steel tubular member of oval cross-section.

3. A torsion bar suspension system comprising, an arcuately-shaped torsion bar, a support, a first lever rigidly connected to said torsion bar and extending from said bar toward the center of curvature of said bar, said first lever having an inner end pivotally attached to the said support with the pivotal axis lying substantially in the plane defined by the arc of the torsion bar and substantially perpendicular to the axis of said first lever, and a second lever rigidly connected to said torsion bar and extending from the bar toward the center of curvature of said bar, said second lever having an inner end pivotally attached to said support with the pivotal axis lying substantially in the plane defined by the arc of the torsion bar and substantially perpendicular to the axis of said second lever.

References Cited in the file of this patent

UNITED STATES PATENTS 1,300,472   O'Connor _____ Apr. 15, 1919